(12) United States Patent
Golan et al.

(10) Patent No.: US 8,285,752 B1
(45) Date of Patent: Oct. 9, 2012

(54) SYSTEM AND METHOD FOR MAINTAINING A PLURALITY OF SUMMARY LEVELS IN A SINGLE TABLE

(75) Inventors: Avi Golan, Petach-Tikva (IL); Alon Lubin, Rishon-Lezion (IL); Nir Tzur, Bene-Zion (IL); Yossi Kachlon, Tel-Aviv (IL)

(73) Assignee: Symantec Operating Corporation, Mountain View, CA (US)

( * ) Notice: Subject to any disclaimer, the term of this patent is extended or adjusted under 35 U.S.C. 154(b) by 1530 days.

(21) Appl. No.: 11/384,694

(22) Filed: Mar. 20, 2006

(51) Int. Cl.
*G06F 7/00* (2006.01)
*G06F 17/30* (2006.01)

(52) U.S. Cl. ......... 707/802; 707/688; 707/689; 707/694

(58) Field of Classification Search .................. None
See application file for complete search history.

(56) References Cited

U.S. PATENT DOCUMENTS

| | | | |
|---|---|---|---|
| 6,385,604 B1 | 5/2002 | Bakalash | |
| 6,513,065 B1 | 1/2003 | Hafez | |
| 6,560,647 B1 | 5/2003 | Hafez | |
| 7,315,849 B2 | 1/2008 | Bakalash | |
| 7,392,248 B2 | 6/2008 | Bakalash | |
| 2003/0061358 A1* | 3/2003 | Piazza et al. | 709/227 |
| 2004/0215626 A1* | 10/2004 | Colossi et al. | 707/100 |

* cited by examiner

*Primary Examiner* — Asad M Nawaz
*Assistant Examiner* — Justin N Mullen
(74) *Attorney, Agent, or Firm* — Meyertons, Hood, Kivlin, Kowert & Goetzel, P.C.

(57) ABSTRACT

A system, method, and computer-accessible medium are disclosed for maintaining data at a plurality of summary levels in a single table. Data may be summarized into a plurality of summary levels. Each of the summary levels may comprise summarized data over a respective one of a plurality of intervals of time. The plurality of summary levels may vary in granularity of the summarized data. The summarized data in the plurality of summary levels may be stored in a single table in a database.

10 Claims, 8 Drawing Sheets

SYSTEM AND METHOD FOR MAINTAINING A PLURALITY OF SUMMARY LEVELS IN A SINGLE TABLE

BACKGROUND

1. Field of the Invention

This invention relates to the field of database management and, more particularly, to techniques for maintaining summarized data.

2. Description of the Related Art

In the information technology (IT) departments of modern organizations, one of the biggest challenges is meeting the increasingly demanding service levels required by users. With more and more applications directly accessible to customers via automated interfaces such as the world wide web, "normal" business hours for many enterprises are now 24 hours a day, 7 days a week. The need for continuous availability and performance of applications has created complex, tiered IT infrastructures which often include web servers, middleware, networking, database, and storage components. These components may be from different vendors and may reside on different computing platforms. A problem with any of these components can impact the performance of applications throughout the enterprise.

The performance of key applications is a function of how well the infrastructure components work in concert with each other to deliver services. With the growing complexity of heterogeneous IT environments, however, the source of performance problems is often unclear. Consequently, application performance problems can be difficult to detect and correct. Furthermore, tracking application performance manually can be an expensive and labor-intensive task. Therefore, it is usually desirable that application performance management tasks be automated.

Automated tools for application performance management may assist in providing a consistently high level of performance and availability. These automated tools may result in lower costs per transaction while maximizing and leveraging the resources that have already been spent on the application delivery infrastructure. Automated tools for application performance management may give finer control of applications to IT departments. Application performance management tools may enable IT departments to be proactive and fix application performance issues before the issues affect users. Historical performance data collected by these tools can be used for reports, trending analyses, and capacity planning. By correlating this collected information across application tiers, application performance management tools may provide actionable advice to help IT departments solve current and potential problems.

In a real-world environment, the performance of applications may be highly variable due to normal variations in resource usage over time. Furthermore, requirements such as user needs, usage patterns, customization requirements, system components, architectures, and platform environments may vary from business unit to business unit. These variations may also cause application performance to be highly variable. Tuning applications to work together efficiently and effectively in their unique environments can be crucial to reaching organizational goals and maintaining competitive advantages. Automated tools for application performance management can assist in these tuning operations.

Systems for monitoring and managing application performance typically generate and store performance metrics for monitored systems. For example, these metrics may measure resource usage for a particular element of hardware (e.g., CPU, memory, network, etc.) or software (e.g., operating system processes, application processes, number of users, etc.) over time. Raw performance data or other historical data may be summarized into a plurality of summary levels, with each summary level representing a summary of a particular performance metric or other data element over a particular interval of time (e.g., per hour, per day, etc.). Prior approaches have stored each summary level in a different table in a database. However, these approaches for storing performance data and other warehouse data may lead to the storage of redundant data and to inefficient retrieval.

It is desirable to provide improved methods and systems for efficiently storing, retrieving, and processing warehouse data.

SUMMARY

A system, method, and computer-accessible medium are disclosed for maintaining a plurality of summary levels of data in a single table. The method may include summarizing data into a plurality of summary levels. The original, unsummarized data may be referred to as "raw" data. Each of the summary levels may comprise summarized data over a respective one of a plurality of intervals of time, and the plurality of summary levels may vary in granularity of the summarized data. For each summary level, the summarized data may be generated by summarizing the data from the preceding (i.e., next finest in granularity) level.

The method may also include storing the summarized data in the plurality of summary levels in a single table in a database. This table may be referred to herein as a "statistics table." For each summary level, summarized data may be stored in a temporary data structure (e.g., a table or a division of a database or table such as a partition) as it is generated and then merged into the common statistics table. The original, raw data may also be stored in the statistics table. The statistics table may be queried for summarized data from one or more of the summary levels and/or the raw data.

In one embodiment, the data may include performance data describing performance of a monitored system. In one embodiment, the performance data may be gathered on a routine basis by appropriate components of a performance management system such as agent software, a measurement component, and/or discovery component. The summarized data may comprise summarized performance data describing performance of the monitored system over a plurality of intervals of time. For example, the summary levels may include summaries over various intervals of time such as: hour, hour group (e.g., four hours), day, week, and month.

BRIEF DESCRIPTION OF THE DRAWINGS

A better understanding of the present invention can be obtained when the following detailed description is considered in conjunction with the following drawings, in which.

Figure 1:
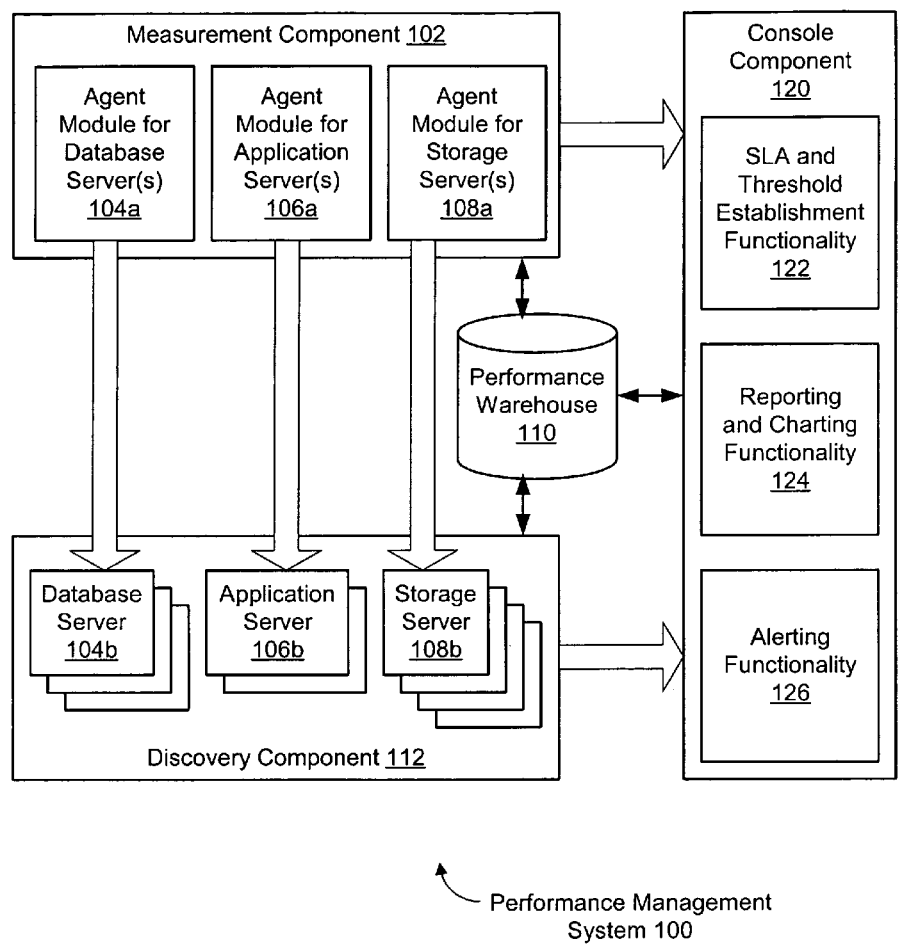
FIG. 1 illustrates a performance management system for maintaining a plurality of summary levels of warehouse data in a single table according to one embodiment.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Using the systems, methods, and computer-accessible media described herein, a plurality of summary levels of data may be maintained in a single table. The stored data may be referred to herein as warehouse data or historical data. In one embodiment, each of the summary levels may describe the performance of a monitored system over a different interval of time (e.g., per hour, per four hours, per day, per week, per month), and the summary levels may therefore vary in granularity. By storing the summarized data in a single table, storage requirements may be reduced. Furthermore, warehouse data may be queried more efficiently, especially when data across multiple summary levels is sought. FIGS. 1, 2A, 2B, and 6 illustrate examples of computer systems which may be used with the systems, methods, and computer-accessible media for warehouse data management described herein. The example configurations shown in FIGS. 1, 2A, 2B, and 6, and the quantity and kind of elements shown therein, are intended to be illustrative rather than limiting, and other embodiments are possible and contemplated.

In one embodiment, the warehouse data may comprise performance data which is captured by a performance management system. A performance management system which is suitable for implementing the techniques described herein may include one or more software programs for application performance management. By continuously monitoring key components and/or applications of computer systems, the performance management system may act to detect and correct performance problems among applications and other system components in a complex computing environment. The performance management system may provide performance management in a variety of stages, such as: identification of symptoms that could indicate a performance problem, identification of sources or locations of problems, discovery of root causes of problems, recommendation of measures to address the root causes and improve performance, and verification that the measures have achieved desired goals. By defining baselines for "normal" application behavior, the performance management system may automatically detect degradation based on those established norms.

In one embodiment, the performance management system may be implemented in a variety of versions, each of which is customized for management of a particular class of target software: e.g., various products from PeopleSoft, Inc.; Oracle® database management software and related applications; web-based applications; SAP®; various products from Siebel Systems, Inc.; Clarify CRM™; J2EE™; and other suitable targets. Furthermore, each of the versions may be implemented on one or more computing platforms (e.g., Solaris running on Sun Microsystems™ hardware, or a Microsoft Windows® OS running on Intel-based hardware). As used herein, the term "performance management system" is intended to include all of these disparate, customized software programs.

FIG. 1 is an architecture diagram of a performance management system 100 in an exemplary configuration. As illustrated in FIG. 1, the performance management system 100 may include components such as a measurement component 102 (including various agent modules 104a, 106a, and 108a), a discovery component 112, a console component 120, and a performance warehouse 110. The various components of the performance management system 100 may reside on the same computer system, on different computer systems, or on an arbitrary combination of computer systems. An exemplary computer system which is suitable for implementing the performance management system 100 is illustrated in FIG. 14.

In one embodiment, the measurement component 102 uses agent software to capture performance metrics or other data on servers running target applications. The measurement component 102 may provide a "breadth-wise" view of performance across multiple technology tiers (e.g., web clients, web servers, networks, application servers, database servers, storage servers, etc.). The measurement component 102 may measure, for example, end-to-end response times from the viewpoint of a user. The measurement component 102 may measure segmented response times from tier to tier and may therefore indicate the location of performance problems in a particular tier.

In one embodiment, a "base" version of the measurement component 102 may provide monitoring of a limited set of targets (e.g., TCP/IP-based applications). The functionality of the measurement component 102 may be augmented with optional agent modules that are customized to gather and analyze data for particular targets (e.g., web clients, web servers, networks, application servers, database servers, storage servers, etc.). For purposes of illustration and example, three agent modules 104a, 106a, and 108a are shown. Other combinations of agent modules may be used in other configurations.

In one embodiment, the discovery component 112 provides identification and resolution of root causes of performance degradation. By permitting a user to "drill down" through various tiers of hardware and software (e.g., individual servers), the discovery component 112 may provide a "depth-wise" view of performance within each of the tiers that a target application crosses. The discovery component 112 may further indicate steps to be taken to fix current problems or avoid future problems.

In FIG. 1, each of the server blocks 104b, 106b, and 108b within the discovery component 112 are intended to represent installations of agent software on the respective servers. For example, the three database server blocks 104b represent three agent software modules associated with three respective database server installations. Likewise, the two application server blocks 106b represent two agent software modules associated with three respective application server installations, and the four storage server blocks 108b represent four agent software modules associated with four respective storage server installations. The combination of servers 104*b*, 106*b*, and 108*b* is provided for purposes of illustration and is not intended to be limiting.

In one embodiment, the console component 120 includes a "watchdog" layer that communicates key performance indicators, such as exceptions to service level agreements (SLAs), to appropriate users at appropriate times. The console component 120 may include functionality 122 for establishing SLAs and other thresholds. The console component 120 may include functionality 124 for reporting and charting. The console component 120 may include functionality 126 for providing alerts. Therefore, the console component 120 may function as a management console for user interaction with the measurement component 102 and discovery component 112.

In one embodiment, the performance warehouse 110 comprises warehouse data accessible to the other components in the performance management system 100. For example, historical data in the performance warehouse 110 may be used by the other components to provide short- and long-term analysis in varying degrees of detail. Historical data stored in the performance warehouse 110 may comprise "raw" data (e.g., raw performance data) gathered by the measurement component 102 and/or discovery component 112. The historical data stored in the performance warehouse 110 may also comprise summarized data (e.g., summarized performance data) having a coarser granularity than the raw data. The performance warehouse 110 may comprise a database management system (DBMS) enabling storage and retrieval of structured data. In one embodiment, the database management system may comprise a relational database management system (RDBMS) which implements the Structured Query Language (SQL) standard. In various embodiments, the DBMS may comprise database products such as Oracle®, Microsoft SQL Server®, DB2®, and other suitable systems. As discussed in greater detail below, the performance warehouse 110 may be used for storage and retrieval of a plurality of summary levels of warehouse data in a single table.

Figure 2A:
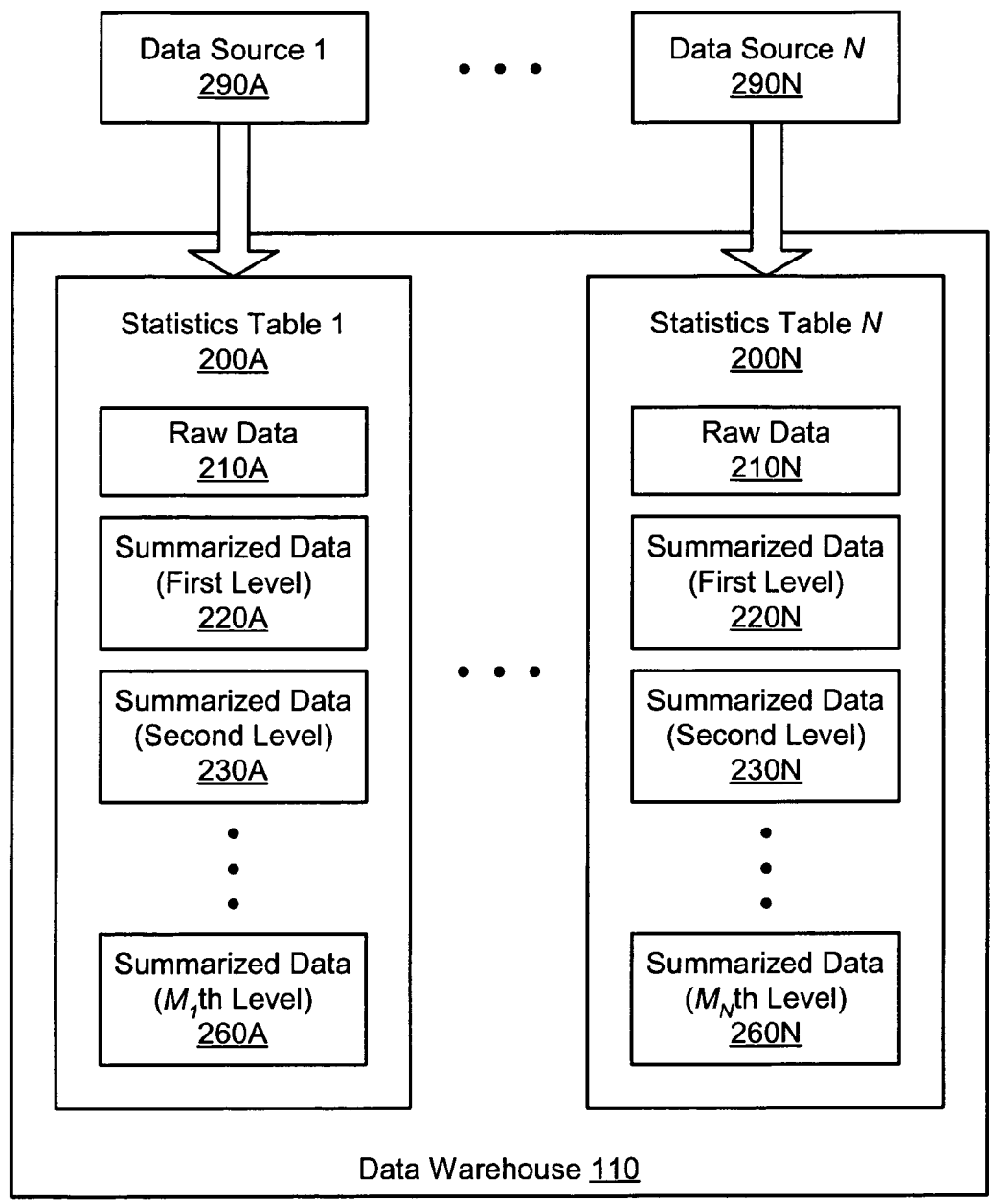
FIG. 2A illustrates a system for maintaining a plurality of summary levels of warehouse data in a single table according to one embodiment.

FIG. 2A illustrates a system for maintaining a plurality of summary levels of warehouse data in a single table according to one embodiment. For each performance metric or other data element sought to be tracked over time, a single table may be maintained in the data warehouse 110. The warehouse 110 may therefore store a plurality of tables 200A-200N corresponding to data sources 290A-290N. The tables 200A-200N may be referred to as statistics tables. Each statistics table 200A-200N may comprise raw data (210A-210N, respectively) and one or more levels of summarized data based upon the raw data. The number of levels of summarized data may vary from table to table. For example, the warehouse 110 may store a first statistics table 200A which tracks historical data from a first data source 290A. The first statistics table 200A may comprise raw data 210A and a plurality of levels of summarized data, such as a first level of summarized data 220A, a second level of summarized data 230A, and a final ($M_1$th) level of summarized data 260A. The warehouse 110 may also store an Nth statistics table 200N which tracks historical data from an Nth data source 290N. The Nth statistics table 200N may comprise raw data 210N and a plurality of levels of summarized data, such as a first level of summarized data 220N, a second level of summarized data 230N, and a final ($M_N$th) level of summarized data 260N.

Figure 2B:
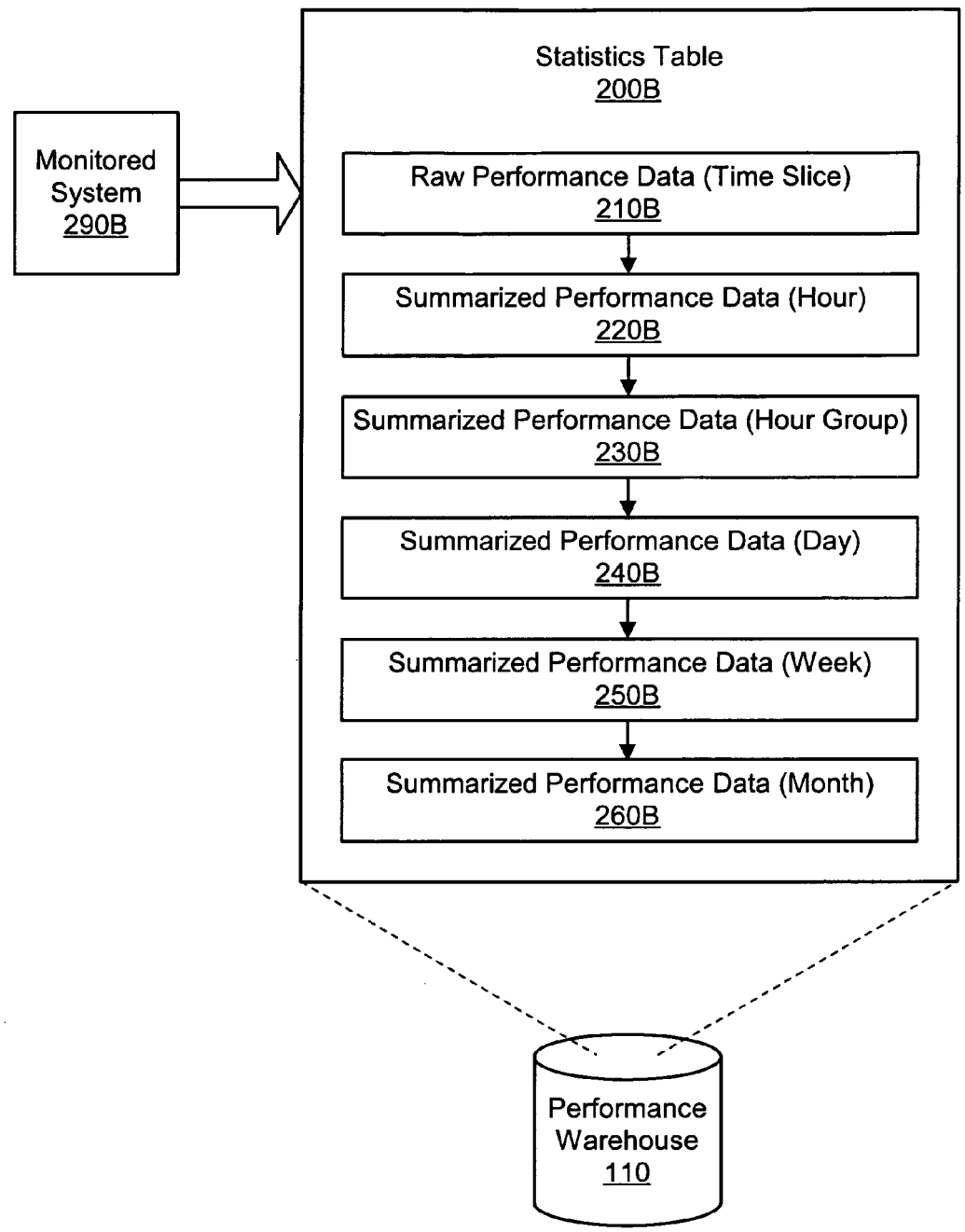
FIG. 2B illustrates a performance management system for maintaining a plurality of summary levels of performance data in a single table according to one embodiment.

As discussed above, the warehouse data may comprise performance data in one embodiment. FIG. 2B illustrates a performance management system for maintaining a plurality of summary levels of performance data in a single table according to one embodiment. A single statistics table 200B may store performance data over a plurality of summary levels for at least one performance metric. A performance metric may measure, for example, resource usage for a particular element of hardware (e.g., CPU, memory, network, etc.) or software (e.g., operating system processes, application processes, database queries, etc.) over time. For example, a particular performance metric may measure the performance and usage of a particular SQL statement over time. In one embodiment, the performance warehouse 110 may store one statistics table 200B for every performance metric. For purposes of illustration, FIG. 2B shows one statistics table 200B tracking one performance metric (i.e., representing the performance of a monitored system or other data source 290B) over time. However, it is contemplated that the performance warehouse 110 may be used for storage of a plurality of statistics tables as illustrated in FIG. 2A. In one embodiment, the statistics table 200B may comprise performance data over the following intervals of time: "raw" performance data (time slice) 210B, hour 220B, hour group (e.g., four hours) 230B, day 240B, week 250B, and month 260B. However, it is contemplated that the statistics table 200B may be used for storage of performance data over other intervals of time. As used herein, the term "performance data" may comprise both raw performance data and summarized performance data.

Periodically, instances at each level of warehouse data from raw data to the next-to-coarsest summarization level may be summarized to the next level of coarseness. For example, for the statistics table 200B illustrated in FIG. 2B, the raw data 210B may be summarized to hourly data 220B, the hourly data 220B may be summarized to hour group data 230B, the hour group data 230B may be summarized to daily data 240B, the daily data 240B may be summarized to weekly data 250B, and the weekly data 250B may be summarized to monthly data 260B. For example, if a particular SQL statement is processed fifteen times in a particular day, then the statistics table 200B may comprise one instance of performance data for that SQL statement at the day summary level 240B. In one embodiment, the raw performance data 210B may be collected by the relevant components of the performance management system on a substantially continuous basis.

In one embodiment, the summarized warehouse data may be generated on a periodic basis (e.g., once per day). In one embodiment, the summarization process may be triggered by a scheduler component associated with the warehouse 110. The summarization process may further comprise the purging of outdated instances from any of the levels of warehouse data. The summarization process may also be referred to herein as the aggregation process, and the summarized warehouse data may also be referred to herein as aggregated warehouse data.

In one embodiment, a statistics table 200A-200N may be implemented in accordance with a template such as the following template:

<table-definition name="PW_TUAC_ACTIONS_S"
      type="STATISTICS" pctfree="0" pctused="80" initrans="5" maxtrans="7">
      <column-definition name="TUAC_TIMESTAMP"
        data-type="TIMESTAMP" null="FALSE"
        type="DATE"/>
      <column-definition name="TUAC_PWHG_ID" data-type="INTEGER" data-length="4" null="FALSE"
        type="IDENTIFIER"/>

```
<column-definition
    name="TUAC_MINUTES_COUNT_SUM" data-
    type="INTEGER" data-length="9" null="FALSE"
    type="SUM" default="15"/>
<column-definition
    name="TUAC_PWII_INSTANCE_ID" data-
    type="INTEGER" data-length="9" null="FALSE"
    type="IDENTIFIER"/>
<column-definition
    name="TUAC_SUMMARY_LEVEL" data-
    type="INTEGER" data-length="2" null="FALSE"
    type="IDENTIFIER" default="1"/>
<index-definition name="IW_TUAC_01_T"
    dbms="oracle" unique="FALSE"
    primary="FALSE" clustered="FALSE" columns-
    order="TUAC_PWII_INSTANCE_ID ASC TUA-
    C_RECIEVED_TIMESTAMP ASC TUAC_TIMES-
    TAMP ASC"/>
<summary-levels value="T,H,G,D,W,M">
<baseline name="PW_TUAC_ACTIONS_B" oracle-
    additional-clause="NOLOGGING"/>
</table-definition>
```

In one embodiment, each summary level may be characterized by a particular retention period. A retention period is a period of time (e.g., a number of days) for which an instance of warehouse data at that summary level is kept. For example, for the statistics table 200B illustrated in FIG. 2B, default retention periods may be 2 days for raw data 210B, 12 days for hourly data 220B, 14 days for hour group (e.g., four hours) data 230B, 9 weeks for daily data 240B, 9 months for weekly data 250B, and 2 years for monthly data 260B, for a total of three years of data. Each level may therefore vary in the scope of its historical coverage. The retention periods may be configured by an administrator of the performance management system 100 to suit particular needs.

In one embodiment, a statistics table may comprise a plurality of partitions. A partition may comprise a division of a database or of its constituent elements (e.g., tables). For example, each summary level may comprise one or more partitions, and the partitions belonging to the summary level may be characterized by a particular partition period. Each partition may correspond to a period of time such as one or more days. In one embodiment, partitions may be created based on time range. For supporting database management systems, cluster ID may also be used as a sub-partition. In one embodiment, the partition size for each summary level may be dynamic and based on the configured retention period for the level. For example, the partition size (in days) may be calculated by dividing the retention period by a pre-defined constant (e.g., 5). In one embodiment, however, partition size may not be less than one day or less than the size of the time interval at the summary level. In one embodiment, partition sizes based on the default retention periods may be 1 day (2-3 partitions) for time slice data 210, 2 days (5-6 partitions) for hourly data 220, 3 days (5-6 partitions) for hour group (e.g., four hours) data 230, 13 days (5-6 partitions) for daily data 240, 54 days (5-6 partitions) for weekly data 250, and 146 days (5-6 partitions) for monthly data 260.

Figure 3A:
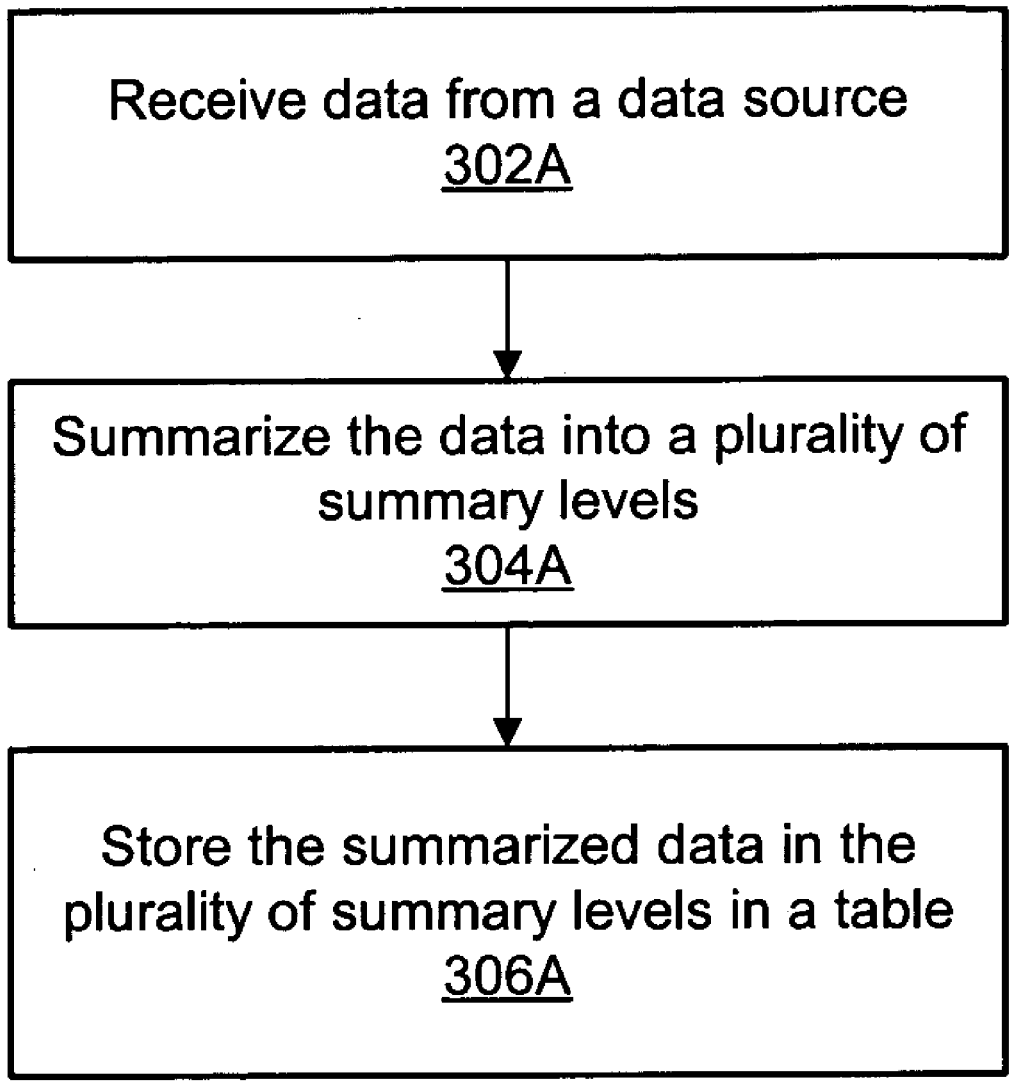
FIG. 3A is a flowchart which illustrates a method for maintaining a plurality of summary levels of warehouse data in a single table according to one embodiment.

FIG. 3A is a flowchart which illustrates a method for maintaining a plurality of summary levels of warehouse data in a single table according to one embodiment. Any of the steps illustrated in FIG. 3 may be performed programmatically and automatically by use of computer-executable program instructions. In alternate embodiments, any of the steps illustrated in FIG. 3 may be performed in a different order. In 302A, data may be received from a data source. The data may comprise "raw" data describing aspects of operation of the data source. As discussed above, the data may be gathered or generated on a routine basis by appropriate components of a performance management system 100 such as by a measurement component 102 and/or discovery component 112.

In 304A, the data may be summarized into a plurality of summary levels. Each of the summary levels may comprise summarized data over a respective one of a plurality of intervals of time, and the plurality of summary levels may vary in granularity of the summarized data. The summarization process shown in 304A is further illustrated in FIG. 4. In 306A, the summarized data in the plurality of summary levels may be stored in a statistics table as discussed with reference to FIG. 2A. The original, "raw" data generated in 302A may also be stored in the same statistics table. In one embodiment, step 302A may occur repeatedly on a routine basis, and steps 304A and 306A may also occur on a routine basis but less often than step 302A (e.g., once per day).

Figure 3B:
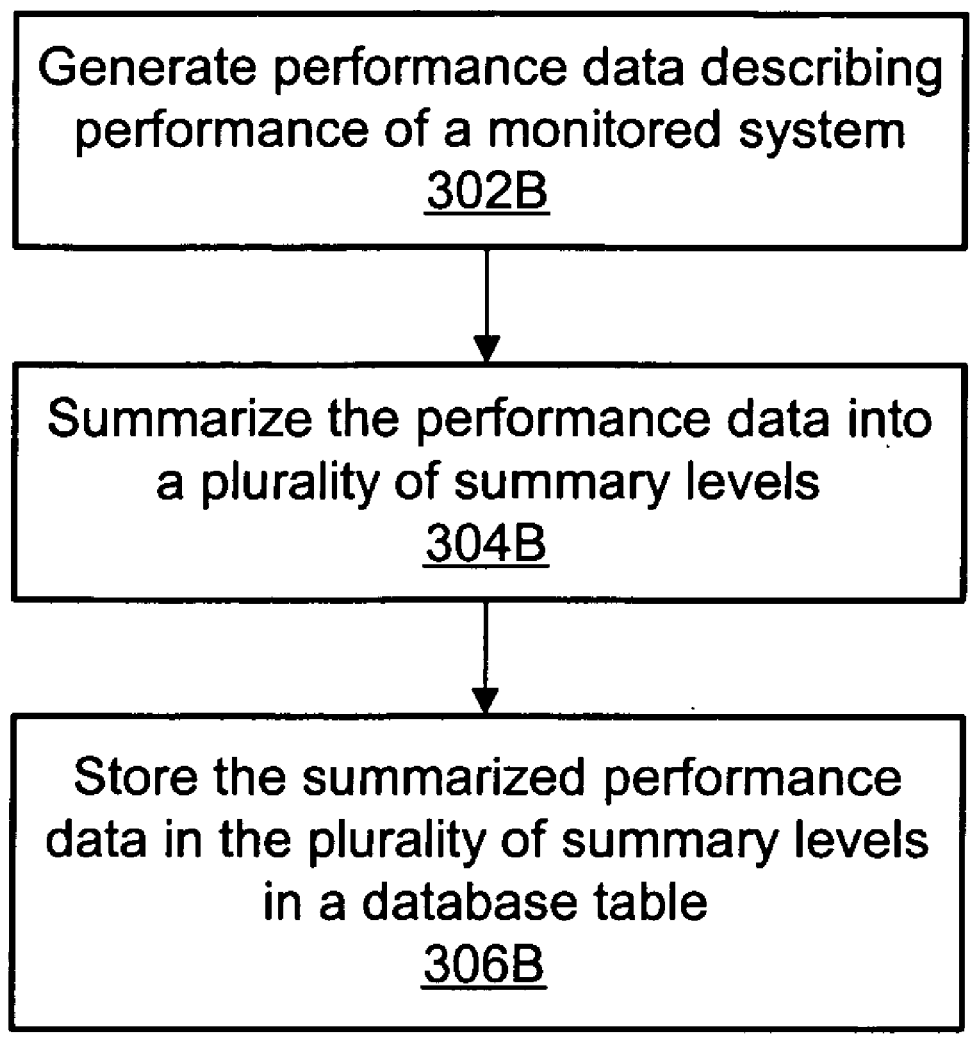
FIG. 3B is a flowchart which illustrates a method for maintaining a plurality of summary levels of performance data in a single table according to one embodiment.

In one embodiment, the warehouse data may comprise performance data describing performance of a monitored system. FIG. 3B is a flowchart which illustrates a method for maintaining a plurality of summary levels of performance data in a single table according to one embodiment. Any of the steps illustrated in FIG. 3B may be performed programmatically and automatically by use of computer-executable program instructions. In alternate embodiments, any of the steps illustrated in FIG. 3B may be performed in a different order. In 302B, performance data describing performance of a monitored system may be generated. The data generated in 302B may comprise "raw" data. As discussed above, the raw performance data may be generated on a routine basis by appropriate components of a performance management system 100 such as by a measurement component 102 and/or discovery component 112.

In 304B, the performance data may be summarized into a plurality of summary levels. Each of the summary levels may comprise summarized performance data describing the performance of the monitored system over a respective one of a plurality of intervals of time, and the plurality of summary levels may vary in granularity of the summarized data. The summarization process shown in 304B is further illustrated in FIG. 4. In 306B, the summarized data in the plurality of summary levels may be stored in a statistics table 200B as discussed with reference to FIG. 2B. The original, "raw" data generated in 302B may also be stored in the same statistics table 200B. In one embodiment, step 302B may occur repeatedly on a routine basis, and steps 304B and 306B may also occur on a routine basis but less often than step 302B (e.g., once per day).

Storage of the various summary levels in a single table may decrease storage requirements significantly and also increase the efficiency of data retrieval. For example, the single statistics table may be queried for summarized data from two or more of the plurality of summary levels. The single statistics table may also be queried for data among both the raw data and the summarized data.

Figure 4:
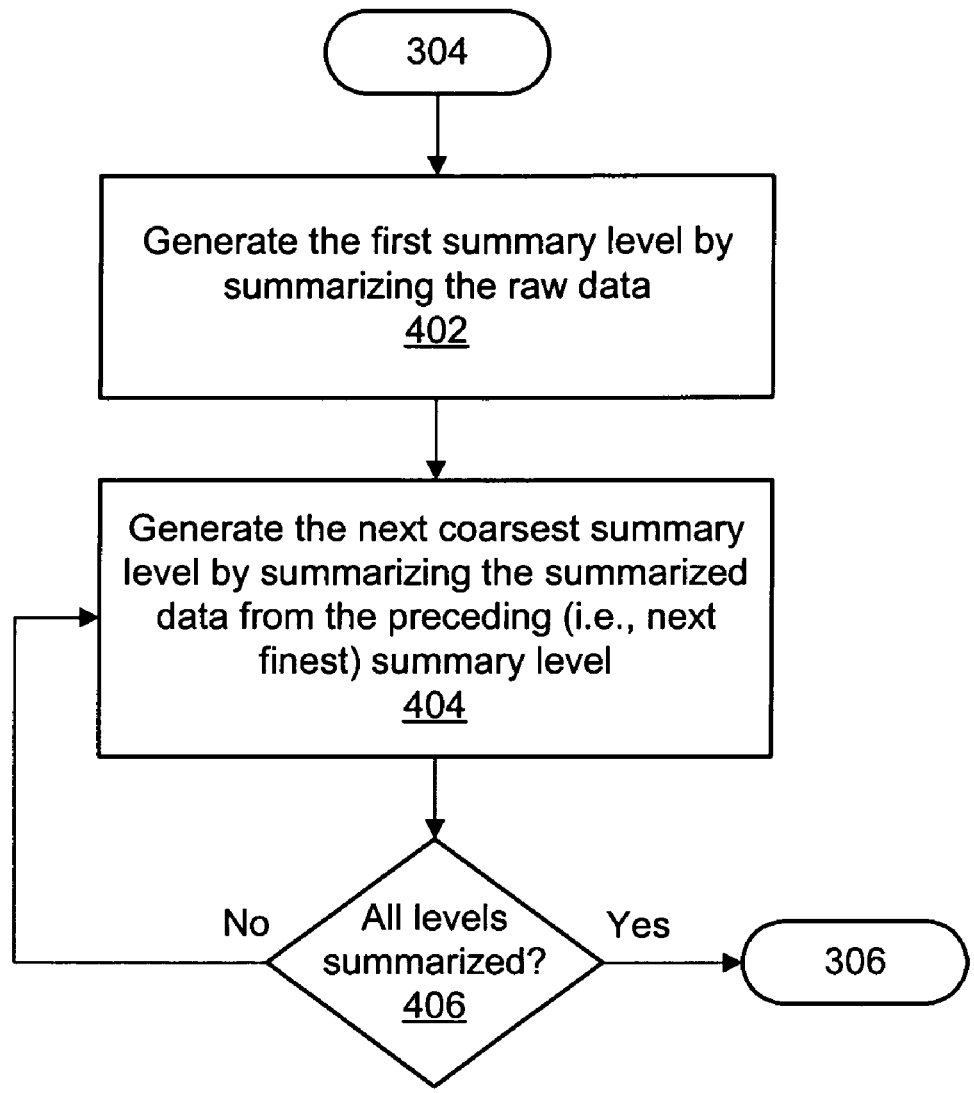
FIG. 4 is a flowchart which further illustrates a method for summarizing data into a plurality of summary levels according to one embodiment.

FIG. 4 is a flowchart which further illustrates a method for summarizing data into a plurality of summary levels according to one embodiment. Any of the steps illustrated in FIG. 4 may be performed programmatically and automatically by use of computer-executable program instructions. Summarizing the data into the plurality of summary levels as shown in 304A or 304B may comprise steps 402, 404, and 406 of FIG. 4. The plurality of summary levels may be ordered from finest to coarsest with respect to the granularity of the summarized data. The plurality of summary levels may comprise a first summary level and one or more additional summary levels, with the first summary level 220 being the finest in granularity. In 402, the summarized data at the first summary level 220 may be generated by summarizing the "raw" data 210.

For each additional summary level, the summarized data may be generated by summarizing the summarized data from the preceding (i.e., next finest in granularity) summary level as shown in 404. As illustrated in 406, the process may continue until all summary levels have been generated. As discussed above, the summarized data may comprise summarized performance data. Any of the steps illustrated in FIG. 4 may be performed programmatically and automatically by use of computer-executable program instructions.

Figure 5:
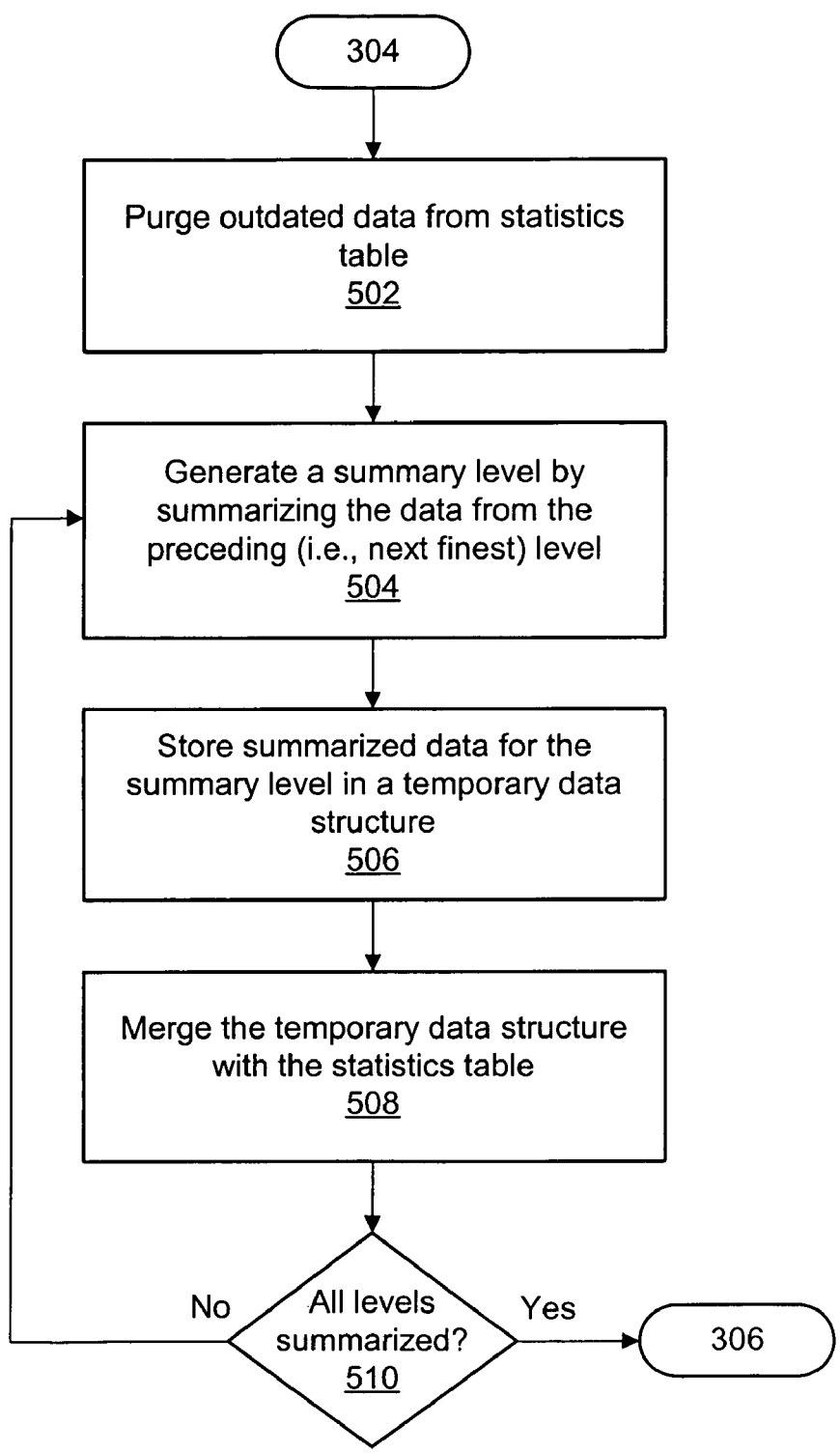
FIG. 5 is a flowchart which further illustrates a method for maintaining a plurality of summary levels of data in a single table according to one embodiment.

FIG. 5 is a flowchart which further illustrates a method for maintaining a plurality of summary levels in a single table according to one embodiment. Summarizing the data into the plurality of summary levels as shown in 304A or 304B may comprise steps 502-510 of FIG. 5. Any of the steps illustrated in FIG. 5 may be performed programmatically and automatically by use of computer-executable program instructions. In alternate embodiments, any of the steps illustrated in FIG. 5 may be performed in a different order.

In 502, outdated data may be purged from the statistics table. In the embodiment illustrated in FIG. 5, the outdated data at all the levels may be purged prior to the start of the entire summarization process. In another embodiment, the outdated data may be purged on a level-by-level basis, prior to summarization of each level. Instances of warehouse data may be purged in 502 if their respective retention periods have expired.

In 504, the summarized warehouse data at each summary level may be generated by summarizing the data from the preceding (i.e., next finest in granularity) level. The summarization process may include determining the retention period for the instance and the retention periods for the two summary levels involved at this stage. The time range may be obtained based on the criteria of the table name, instance, and current summary level. If the time range is greater than or equal to the sum of the retention period and one partition length, then the relevant partitions may be summarized to the next level.

In 506, the summarized warehouse data generated in 504 may be stored in a temporary data structure. In one embodiment, the temporary data structure may comprise a temporary table. In one embodiment, the temporary data structure may comprise a temporary partition of a table. The temporary partition may be external to the statistics table. In 508, the temporary data structure (e.g., the table or partition) may be merged with the statistics table. The merger may be performed in a single, atomic operation. In one embodiment, the merger may comprise exchanging the temporary partition with a corresponding partition in the statistics table. In the embodiment illustrated in FIG. 5, step 508 may be performed on a level-by-level basis, during summarization of each level. In another embodiment, step 508 may be performed only after summarization of all the levels. As illustrated in 510, the summarization process may continue until all summary levels have been generated and merged with the statistics table 200.

Exemplary Computer System

Figure 6:
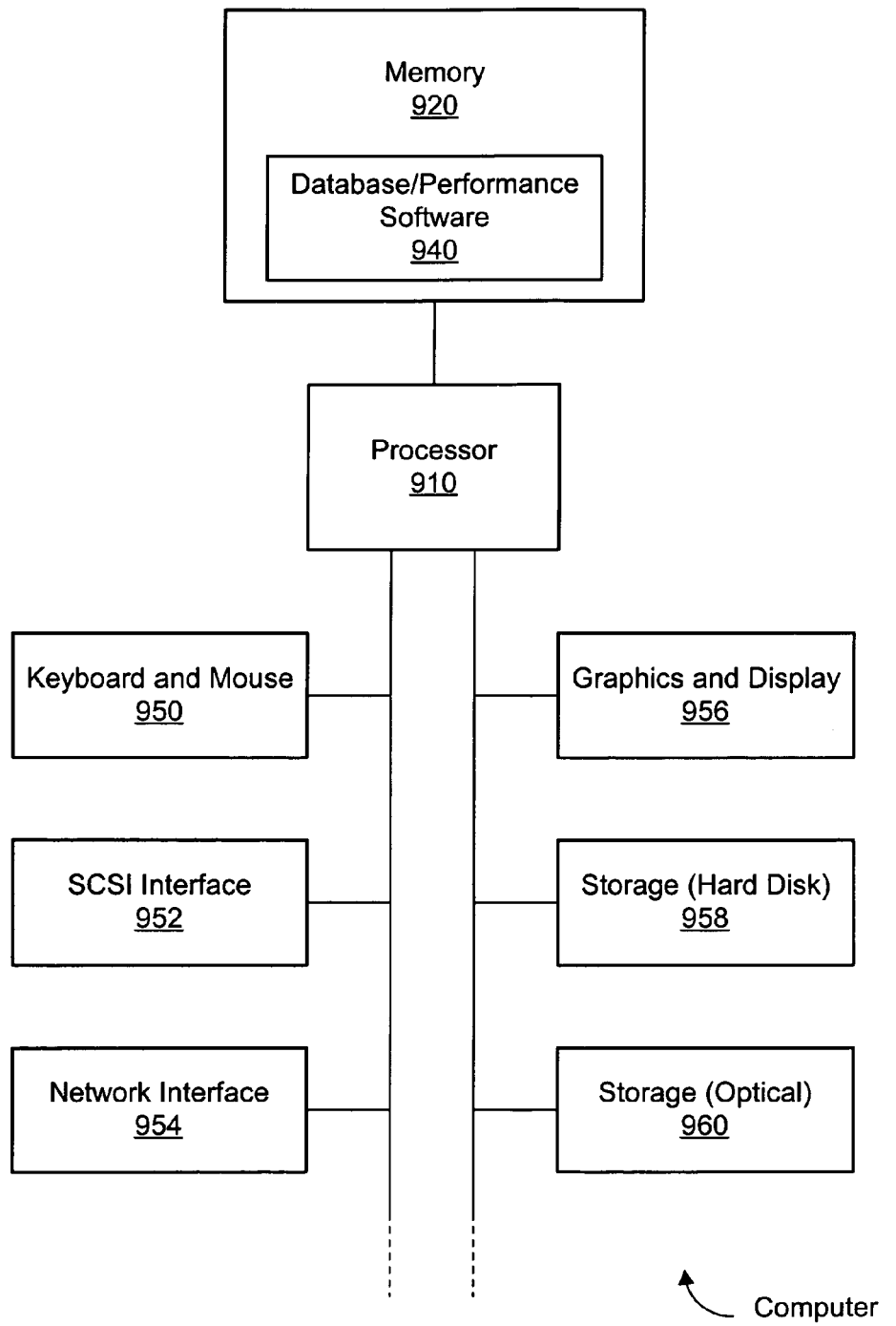
FIG. 6 illustrates a typical computer system for implementing embodiments of the systems and methods described above.

FIG. 6 illustrates a block diagram of a typical computer system 900 for implementing embodiments of the systems and methods described above. Computer system 900 may be illustrative of a computer system in the performance management system 100. As used herein, "computing device" is synonymous with "computer system." Computer system 900 includes a processor 910 and a memory 920 coupled by a communications bus. Processor 910 can be a single processor or a number of individual processors working together. Memory 920 is typically random access memory (RAM), or some other dynamic storage device, and is capable of storing instructions to be executed by the processor, e.g., software 940 for managing a database system and/or managing warehouse data. Memory 920 is also used for storing temporary variables or other intermediate information during the execution of instructions by the processor 910.

Computer system 900 may also include devices such as keyboard & mouse 950, SCSI interface 952, network interface 954, graphics & display 956, hard disk 958, and other nonvolatile storage 960, all of which are coupled to processor 910 by a communications bus. In various embodiments, nonvolatile storage 960 may include optical media devices such as read-only or writable CD or DVD, solid-state devices such as nonvolatile RAM, or any other suitable type of nonvolatile storage. It will be apparent to those having ordinary skill in the art that computer system 900 can also include numerous elements not shown in the figure, such as additional storage devices, communications devices, input devices, and output devices, as illustrated by the ellipsis shown. An example of such an additional computer system device is a Fibre Channel interface. In various embodiments, a database management system (DBMS) may be implemented in software 940 or in an external system (e.g., warehouse 110) which is coupled to the computer system 900 via an interface such as the network interface 954. Examples of suitable DBMS solutions are discussed above with respect to FIG. 1.

Those having ordinary skill in the art will readily recognize that the techniques and methods discussed above can be implemented in software as one or more software programs, using a variety of computer languages, including, for example, traditional computer languages such as assembly language, Pascal, and C; object oriented languages such as C++ and Java; and scripting languages such as Perl and Tcl/Tk. In some embodiments, software 940 may comprise program instructions executable, for example by one or more processors 910, to perform any of the functions or methods described above. Also, in some embodiments software 940 may be provided to the computer system via a variety of computer-accessible media including electronic media (e.g., flash memory), magnetic storage media (e.g., hard disk 958, a floppy disk, etc.), optical storage media (e.g., CD-ROM 960), and communications media conveying signals encoding the instructions (e.g., via a network coupled to network interface 954). In some embodiments, separate instances of these programs can be executed on separate computer systems in keeping with the methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and computer systems with variations in, for example, the number of nodes, the type of operation of the computer system, e.g., cluster operation (failover, parallel, etc.), the number and type of shared data resources, and the number of paths between nodes and shared data resources.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A computer-implemented method comprising:
collecting data indicative of performance of a monitored computer system; storing the data in a database table, wherein the database table is stored on a storage device; summarizing the data into a plurality of summary levels, wherein each of the summary levels comprises summarized data over a respective one of a plurality of intervals of time; storing the summarized data in the plurality of summary levels in the database table, wherein the database table comprises a respective one or more partitions corresponding to each of the plurality of summary levels, wherein the summarized data for each of the plurality of summary levels is stored in the corresponding one or more partitions of the database table, and wherein storing the summarized data comprises, for each of the plurality of summary levels: determining a storage size of each of the one or more partitions for the respective summary level prior to storing the summarized data for the respective summary level, comprising dividing a respective retention period for the respective summary level by a pre-defined constant, wherein at least one of the retention periods is configurable by a user; storing the summarized data for the respective summary level in one or more partitions of a respective temporary database table; and merging the one or more partitions of the respective temporary database table with the one or more partitions of the database table for the respective summary level; and deleting the summarized data from the database table, wherein the summarized data for each of the plurality of summary levels is deleted upon expiration of the respective retention period for the respective summary level.

2. The method of claim 1,
wherein the plurality of summary levels comprises a first summary level and one or more additional summary levels, wherein the plurality of summary levels are ordered from finest to coarsest in granularity of the summarized data;
wherein summarizing the data into the plurality of summary levels comprises:
generating the first summary level by summarizing the data; and
generating each additional summary level by summarizing the summarized data from the next finest summary level.

3. The method of claim 1, further comprising:
querying the database table for summarized data from two or more of the plurality of summary levels.

4. The method of claim 1, further comprising:
querying the database table for data among the data and the summarized data.

5. A non-transitory, computer-accessible memory medium comprising program instructions, wherein the program instructions are computer-executable to implement: collecting data indicative of performance of a monitored computer system; storing the data in a database table, wherein the database table is stored on a storage device; summarizing the data into a plurality of summary levels, wherein each of the summary levels comprises summarized data over a respective one of a plurality of intervals of time; storing the summarized data in the plurality of summary levels in the database table, wherein the database table comprises a respective one or more partitions corresponding to each of the plurality of summary levels, wherein the summarized data for each of the plurality of summary levels is stored in the corresponding one or more partitions of the database table, and wherein storing the summarized data comprises, for each of the plurality of summary levels: determining a storage size of each of the one or more partitions for the respective summary level prior to storing the summarized data for the respective summary level, comprising dividing a respective retention period for the respective summary level by a pre-defined constant, wherein at least one of the retention periods is configurable by a user; storing the summarized data for the respective summary level in one or more partitions of a respective temporary database table; and merging the one or more partitions of the respective temporary database table with the one or more partitions of the database table for the respective summary level; and deleting the summarized data from the database table, wherein the summarized data for each of the plurality of summary levels is deleted upon expiration of the respective retention period for the respective summary level.

6. The non-transitory, computer-accessible memory medium of claim 5,
wherein the plurality of summary levels comprises a first summary level and one or more additional summary levels, wherein the plurality of summary levels are ordered from finest to coarsest in granularity of the summarized data;
wherein summarizing the data into the plurality of summary levels comprises:
generating the first summary level by summarizing the data; and
generating each additional summary level by summarizing the summarized data from the next finest summary level.

7. The non-transitory, computer-accessible memory medium of claim 5, wherein the program instructions are further computer-executable to implement:
querying the database table for summarized data from two or more of the plurality of summary levels.

8. A system comprising: a database management system comprising a storage device, wherein the storage device is configured to store a statistics table; a processor; and a memory coupled to the processor, wherein the memory stores program instructions which are executable by the processor to: collect data indicative of performance of a monitored computer system; store the data in the statistics table; summarize the data into a plurality of summary levels, wherein each of the summary levels comprises summarized data over a respective one of a plurality of intervals of time; store the summarized data in the plurality of summary levels in the statistics table, wherein the database table comprises a respective one or more partitions corresponding to each of the plurality of summary levels, wherein the summarized data for each of the plurality of summary levels is stored in the corresponding one or more partitions of the statistics table, and wherein the program instructions are executable by the processor to: determine a storage size of each of the one or more partitions for the respective summary level prior to storing the summarized data for the respective summary level, comprising dividing a respective retention period for the respective summary level by a pre-defined constant, wherein at least one of the retention periods is configurable by a user; store the summarized data for the respective summary level in one or more partitions of a respective temporary database table, wherein the database management system is configured to store the respective temporary database table; and merge the one or more partitions of the respective temporary database table with the one or more partitions of the statistics table for the respective summary level; and delete the summarized data from the statistics table, wherein the summarized data for each of the plurality of summary levels is deleted upon expiration of the respective retention period for the respective summary level.

9. The system of claim 8,
wherein the plurality of summary levels comprises a first summary level and one or more additional summary levels, wherein the plurality of summary levels are ordered from finest to coarsest in granularity of the summarized data;
wherein, in summarizing the data into the plurality of summary levels, the program instructions are further executable by the processor to:
generate the first summary level by summarizing the data; and
generate each additional summary level by summarizing the summarized data from the next finest summary level.

10. The system of claim 8, wherein the program instructions are further executable by the processor to:
query the statistics table for summarized data from two or more of the plurality of summary levels.

* * * * *